(No Model.)  
W. W. GRANT.  
GAS ENGINE.

No. 497,239. Patented May 9, 1893.

Witnesses.  
Robert Errett,  
Geo. W. Rea.

Inventor:  
William Wallace Grant.  
By James L. Norris.  
Atty.

THE NORRIS PETERS CO., PHOTO-LITHO., WASHINGTON, D. C.

(No Model.) 6 Sheets—Sheet 2.

W. W. GRANT.
GAS ENGINE.

No. 497,239. Patented May 9, 1893.

Witnesses:
Robert Grant
Geo. W. Rea.

Inventor:
William Wallace Grant,
By James L. Norris,
Atty.

(No Model.) 6 Sheets—Sheet 3.

W. W. GRANT.
GAS ENGINE.

No. 497,239. Patented May 9, 1893.

Witnesses,
Robt. Gratt.
Geo. W. Rea.

Inventor,
William Wallace Grant.
By James L. Norris
Atty.

(No Model.)
6 Sheets—Sheet 5.

W. W. GRANT.
GAS ENGINE.

No. 497,239.  Patented May 9, 1893.

Witnesses,
Robert Everett,
Geo. W. Rea.

Inventor,
William Wallace Grant.
By James L. Norris
Atty.

(No Model.)

W. W. GRANT.
GAS ENGINE.

Patented May 9, 1893.

Witnesses.
Robert Everett,
Geo. W. Rea,

Inventor.
William Wallace Grant.
By James L. Norris.
Atty.

UNITED STATES PATENT OFFICE.

WILLIAM WALLACE GRANT, OF BROOKLYN, NEW YORK.

GAS-ENGINE.

SPECIFICATION forming part of Letters Patent No. 497,239, dated May 9, 1893.

Application filed November 8, 1892. Serial No. 451,363. (No model.)

*To all whom it may concern:*

Be it known that I, WILLIAM WALLACE GRANT, a citizen of the United States, residing at Brooklyn, in the county of Kings and State of New York, have invented new and useful Improvements in Gas-Engines, of which the following is a specification.

This invention relates to an explosive gas engine comprising a power cylinder open at both ends and communicating centrally with a valved conduit for admission of a mixture of gas and air, two hollowed pistons that together form a compression and combustion or explosion chamber which communicates with the gas and air conduit, an electric circuit having terminals or electrodes that are constructed and automatically operated to effect at the proper time a twice sparking make and break contact with each other whereby explosion of the compressed gas in the combustion chamber is assured, a shaft provided with levers and sectors for actuating one of the electrodes and the admission and exhaust valves of the gas and air conduit, crank shafts connected with the pistons, and gearing for connecting the crank shafts and equalizing their movements.

The invention also contemplates the connection of two pistons of two cylinders with a single crank shaft to form a duplex engine and the connection of two duplex engines or four pistons of four cylinders with a single crank shaft to form a quadruplex engine, and so on with regard to other multiform engines by which increased power may be obtained, the said engines in all cases possessing the characteristics of the single cylinder explosive engine.

The objects of my improvements are to provide for greater simplicity, efficiency and economy in the construction and operation of that class of gas engines in which the force for moving the pistons is obtained by the electric explosion of a suitable gas or mixture of gases, especially when mingled with oxygen or atmospheric air; to provide for reducing shock and to that extent utilize the wasteful expenditure of energy heretofore lost by absorption and transmission through the rigid walls and heads of the ordinary cylinder and externally manifested in the form of injurious concussions and strains; to provide for a percentum utilization of the heat and waste products of combustion whereby the employment of a costly and cumbersome regenerator is avoided; to provide for connecting the crank shafts and pistons in such a manner as to equalize the application of power to various parts of said crank shafts by so setting the cranks that the pistons of two cylinders in a pair shall move simultaneously in the same directions and in line with each other, and to provide for mounting a fly wheel or fly wheels on a shaft journaled in bearings located in the engine base or frame below and intermediate the crank shafts for the purpose of securing greater compactness, solidity and stability with ready accessibility to all the working parts of the engine and whereby the cost is diminished and its efficiency and reliability greatly increased as compared with other engines of this general character.

To these ends my invention consists in certain peculiar features of construction and novel combinations of devices in a gas engine as hereinafter more particularly described and claimed.

In the annexed drawings illustrating the invention

For convenience in explaining the novel features of my invention I will first describe the same with reference more particularly to a quadruplex engine, several forms of which are illustrated in Figs. 1, 2 11, 12 and 13, but I would have it understood that the invention is equally applicable to a duplex engine, a single cylinder engine and various other forms of explosive gas engines.

Figure 2:
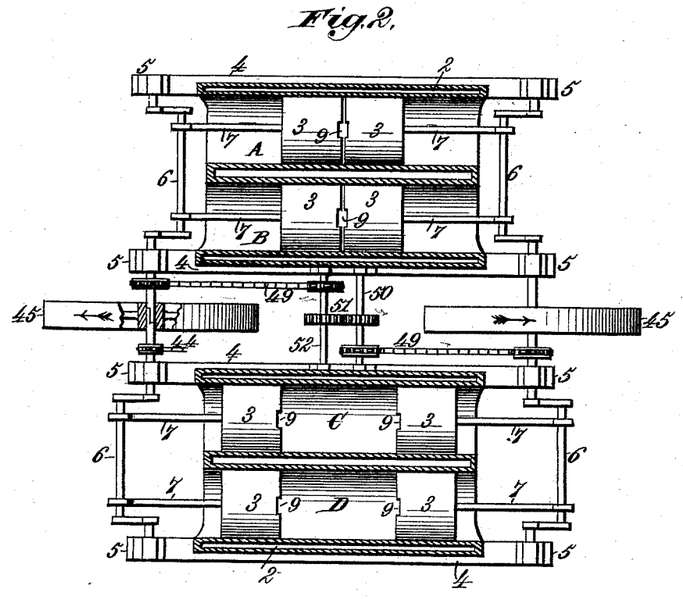
Fig. 2 is a partly sectional plan of the engine with gas supply and electrical connections removed and showing the two crank shafts geared to rotate in opposite directions.
Figure 3:
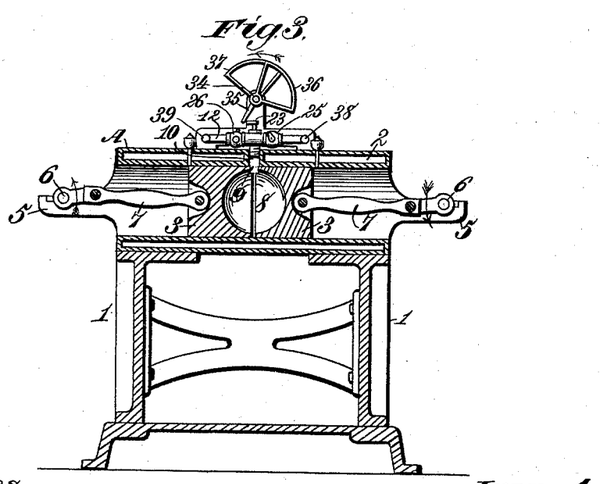
Fig. 3 is a vertical longitudinal section of the engine through one of its cylinders.

Referring to the drawings, the numeral 1 designates a supporting frame, or frames, for the engine cylinder or cylinders and having journal bearings for the fly wheel shaft, as hereinafter described. In the quadruplex form of engine the four cylinders, though of like construction, are designated A, B, C and D, respectively, for convenience of description when hereinafter explaining the operation of the engine. Each cylinder is open at both ends and is preferably constructed with a water jacket 2, Figs. 2 and 3. The interior of each cylinder forms a free and uninterrupted passage of uniform diameter throughout its length so that two pistons 3 inserted at opposite ends can be made to approach each other until they meet or touch. Where the cylinders are arranged in two pairs, as in a quadruplex engine, the outer sides of each pair of cylinders is provided with a longitudinal strengthening rib 4 the ends of which are extended at both ends of the engine to afford bearings 5 for the two crank shafts 6 that are supported at the opposite ends of the cylinders. The pistons 3 are connected with the crank shafts 6 by means of pitmen 7 as shown in Figs. 2 and 3. It will be observed that all the pistons at either end of the engine are connected with the same crank shaft and that in a quadruplex engine the two pistons at either end of a pair of cylinders are connected with the same crank, the several cranks of each crank shaft being arranged to alternate in position as clearly shown in Figs. 2 and 12, whereby the pistons of both cylinders in each pair are permitted to move simultaneously toward or from each other, to assist in accomplishing the respective functions of the several parts of the engine at proper intervals as hereinafter explained.

Figure 11:
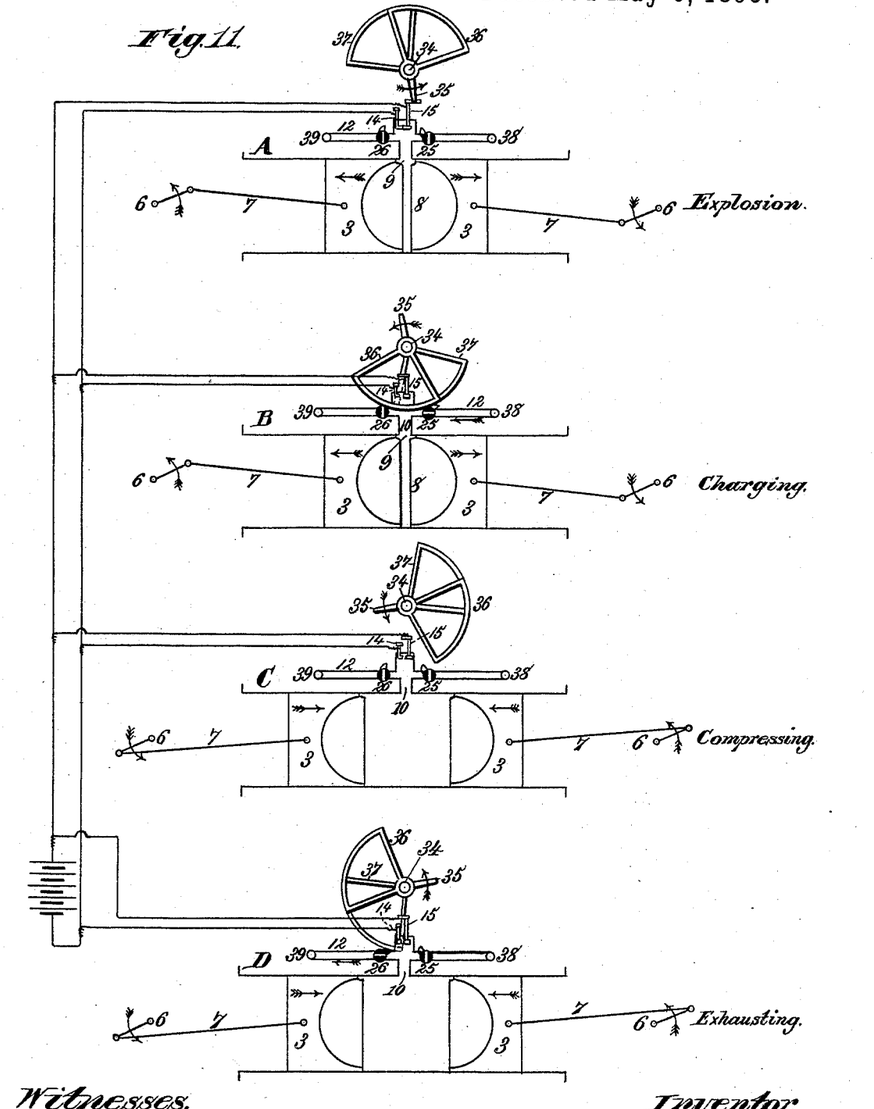
Fig. 11 is a diagrammatic view of the several cylinders, pistons, valves, electrodes, electric circuits and operating mechanism for said valves and electrodes in my improved engine.

The pistons 3 in each cylinder have their adjacent or opposing ends correspondingly hollowed to form within said pistons a combustion or explosion chamber 8, Figs. 3 and 11. This combustion or explosion chamber 8 is preferably in the form of a hollow sphere, as shown, the hollow or recess in the working end of each piston being so concaved as to constitute one half of such sphere. It is obvious, however, that by varying the character of the hollows or recesses in the opposing ends of the pistons the combustion or explosion chamber thus formed may be given any shape and dimensions desired. The object of thus hollowing or recessing the opposing ends of the pistons is that they may draw into the cylinder and compress and hold entirely within the interior of their closely approached ends the charge of gas to be exploded for propelling the pistons on their outward stroke. By reference to Fig. 3 it will be observed that at the conclusion of their inward stroke the adjacent ends of the opposing pistons are approached as closely together as working safety will permit and that their proximity at this time is such that the dividing line through which the cylinder walls are exposed is so narrow and insignificant that its existence may be wholly neglected, the compressed charge of gas being thus, as above stated, entirely or practically contained within the inclosing walls of the two coacting pistons.

In the upper part of each piston at the edge of its hollowed working end is formed one half of a slot or passage 9 through which the combustion or explosion chamber 8 communicates with the gas supply devices. When the pistons 3 are closed together at the end of their inward stroke the slot 9 is directly in line with an opening or port 10 through the cylinder wall, which port is connected, preferably by a nipple 11, Figs. 6 and 7, with a gas supply conduit 12 of any suitable construction that is preferably supported above and in line with the cylinder, as shown.

In the top of each conduit 12 and in line with the port 10 is inserted a screw-plug 13 Figs. 4, 5, 6 and 7 through which are passed the twice sparking electrodes 14 and 15, one of which is preferably stationary while the other is movable. The stationary electrode 14 is preferably surrounded for the greater part of its length by a packing of asbestus, mica or other insulating and infusible material 16 which is contained in a tube 17, Fig. 6, having a spring 18 bearing against its outer side for the purpose of imparting to said tube and inclosed stationary electrode a certain degree of elasticity or flexibility that will insure a proper rubbing contact of the movable electrode. This stationary electrode 14 is preferably in the form of a rod having on one side at its lower end a vertical series of V shaped teeth or contact points 20, Figs. 6 and 8, which are disposed at right angles to a horizontal series of similar teeth or contact points 21 carried by a spoked hub 22 attached to the lower end of the movable electrode 15 as shown in Fig. 9. This manner of connecting the movable electrode to its stem is designed to allow any oil of lubrication upon the stem to drip into the cylinder without liability of coming in contact with and fouling the electrode.

On the upper end of the movable electrode 15 is an actuating arm 23 and between this arm and the top of the screw-plug is a spiral spring 24 that is so attached as to cause the electrode to return automatically to its normal position after it has been previously oscillated or partly rotated in one direction by power applied to the said arm.

Figures 7, 9, 10:
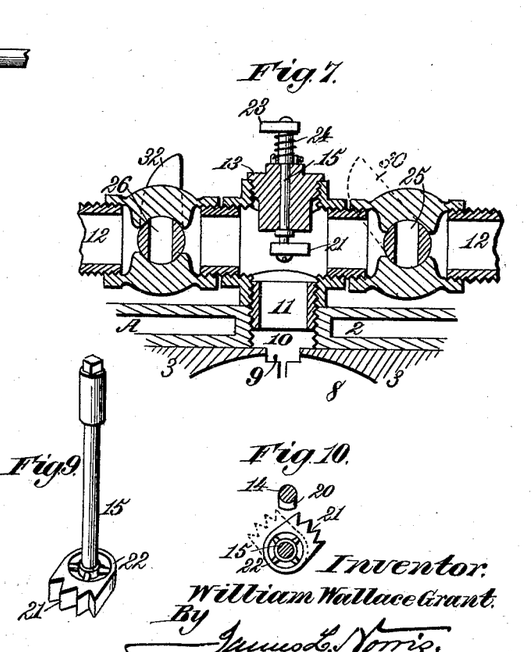
Fig. 7 is a vertical longitudinal section of a portion of a cylinder and its pistons and the valved gas conduit and its connections.
Fig. 9 is a view of the movable electrode.
Fig. 10 is a sectional plan of the twice sparking electrodes illustrating the movements of one of the electrodes.
Figure 8:
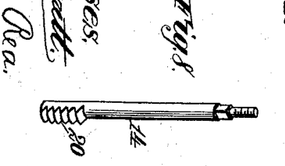
Fig. 8 is a view of the stationary electrode.

At their upper ends the electrodes 14 and 15 are provided with suitable means for the attachment of wires forming part of an electric circuit in which the energy may be derived from a battery or other convenient source. It will be seen that the form and arrangement of the V shaped teeth or contact points 20 and 21 on the electrodes 14 and 15, respectively, is such that when the movable electrode 15 is turned partly about on its longitudinal axis, say by power applied to the arm 23, its teeth 21 will be brought in contact with and caused to rub against and pass entirely by the teeth 20 on the stationary electrode as shown in Fig. 10, thereby producing a spark or series of sparks. As soon as the arm 23 is released the electrode 15 will be returned to its former position by the action of the spring 24 and a second spark or series of sparks will be produced by the succession of interrupted contacts between the electrodes. By this arrangement of twice sparking electrodes the ignition and explosion of the charge of gas is assured at the proper time. The lower ends of the electrodes are preferably situated in the conduit 12 above and in line with the cylinder port 10 but may be extended through said port into the combustion or explosion chamber of the pistons.

Figure 5:
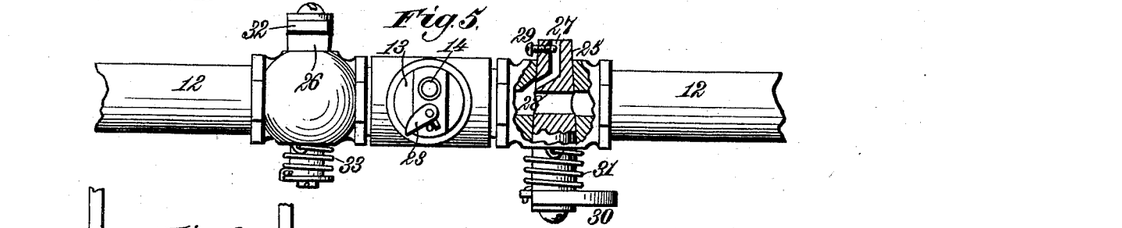
Fig. 5 is a partly sectional plan of a portion of a valved gas conduit showing the gas and air valve open.

The gas supply conduit 12 is provided on one side of the electrodes with a combined gas and air supply valve 25 and on the other side with an exhaust valve 26, as shown in Figs. 5 and 7. These valves, as shown in Fig. 5, are preferably of tapering or conoidal form and project horizontally at both ends from the opposite sides of the gas conduit.

In the valve 25 is an air supply passage 27, Fig. 5, communicating at one point with a gas passage 28 and at one end with the atmosphere. The air passage 27 may be provided with a screw-plug 29 for regulating or cutting off the supply of air. On the large end of the gas and air valve 25 projecting from one side of the conduit 12 is a valve arm 30 through which the valve may be partly rotated in one direction to open the valve and permit the passage of a charge of gas to the engine at the proper time. Surrounding one end of the valve 25, between its arm 30 and the conduit 12 and having one end attached to each is a spiral spring 31 that serves to automatically close the valve when the arm 30 is released. This spring 31 is adapted, also, to seat the valve firmly so as to compensate for wear and prevent leakage. On one end of the exhaust valve 26 is a valve arm 32 through which said valve is opened at the proper time and on the other end is a spiral spring 33 by which the valve is automatically closed when its arm 32 is released. The valve arms 30 and 32 are located on opposite sides of the conduit 12, as shown. It will be seen that as the gas admission and exhaust conduit 12 communicates with the engine cylinder through only a single centrally located port 10 the said port is alternately an admission and exhaust port.

Figure 1:
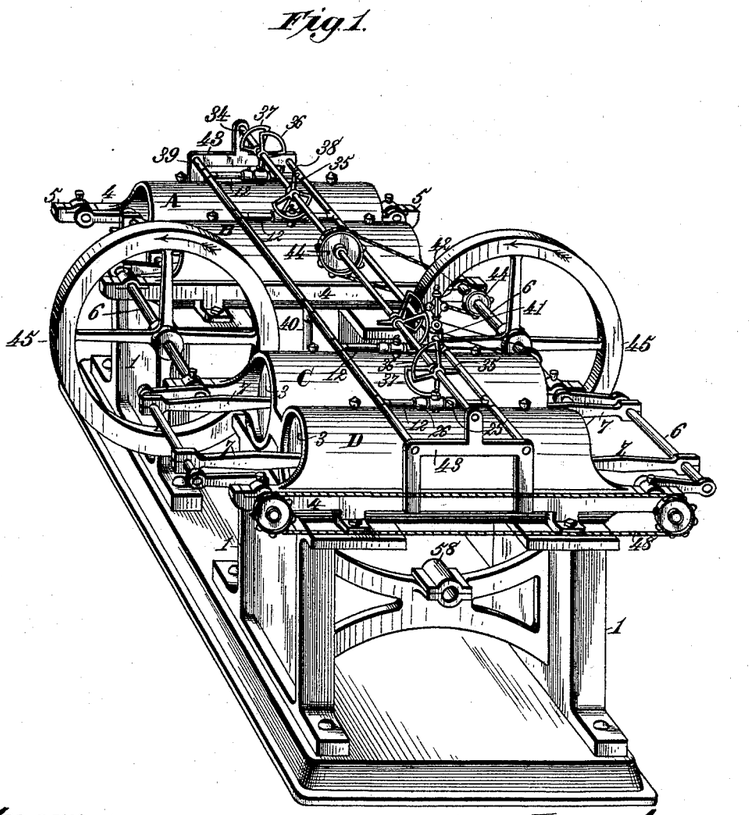
—Figure 1 is a perspective of one form of my improved gas engine showing the two crank shafts geared to rotate in the same direction and each carrying a balance or fly wheel.
Figure 4:
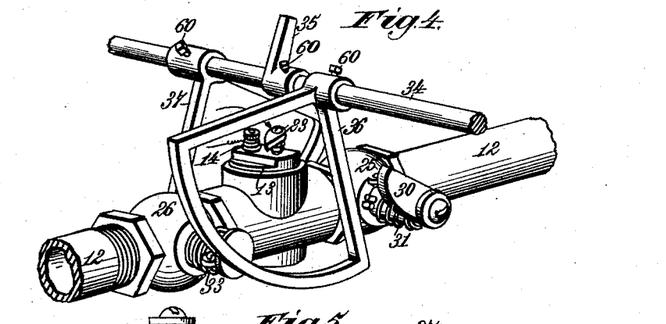
Fig. 4 is a perspective of a portion of one of the valved gas conduits and operating mechanism for the valves and movable electrode.
Figure 6:
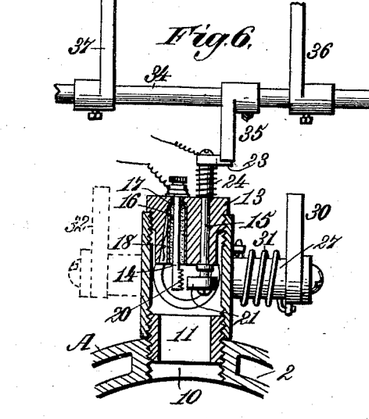
Fig. 6 is a transverse sectional elevation of a portion of an engine cylinder, connected gas conduit and operating mechanism for the valves and movable electrode.

For the purpose of properly operating the movable electrode 15, gas supply valve 25 and exhaust valve 26 a rotary shaft 34, Figs. 1, 4 and 6, is supported in suitable bearings above the engine cylinder or cylinders. This rotary shaft 34 carries one or more levers 35 and one or more sets of quadrants or sectors 36 and 37 according to the number of cylinders comprised in the engine. The lever 35 is arranged to come in contact with the arm 23 of the movable electrode 15 and thereby actuate the same at proper intervals to effect, with assistance of the spring 24, the twice sparking make and break contact of the electrodes 14 and 15 as before mentioned; and the sectors 36 and 37 are respectively adapted to operate at proper intervals against the valve arms 30 and 32 in such direction as to successively open the gas valve 25 and exhaust valve 26 which are subsequently automatically closed by their springs when the sectors become disengaged from said valve arms.

In the quadruplex form of engine the rotary shaft 34 will carry four sets of levers and sectors arranged to operate in proper succession the electrodes and valves of the cylinders A, B, C and D, as illustrated by the diagram shown in Fig. 11. The crank shafts 6 in this form of engine are provided with alternating cranks, as shown in Fig. 2, so arranged or set and each connected by pitmen with the pistons of two immediately adjacent cylinders A, B, or C, D, that when the pistons of the cylinders A B are making their outward stroke or moving away from each other in each of said cylinders the pistons in each of the cylinders C D will be moving toward each other on their inward stroke, and vice versa as the movements of the pistons continue.

By reference to Fig. 11 it will be seen that the several levers 35 and sectors or quadrants 36 and 37 are respectively mounted or set in such positions with relation to the required movements of the pistons in the respective cylinders that while, for instance, at the cylinder A the valves 25 and 26 are both closed and the charge of gas in the combustion chamber 8 is being exploded upon the beginning of the outward stroke of the pistons by the twice sparking make and break contact of the electrodes induced by the successive actions of the lever 35 and spring 24, Fig. 6, on the movable electrode 15, simultaneously at the adjacent cylinder B the sector or quadrant 36 will have been moved into position and action on the valve arm 30, Fig. 4, thereby opening the combined gas and air valve 25 and thus permitting charging of the combustion or explosion chamber 8 in and between the receding or opening pistons of that cylinder. Thus while an explosion of gas is being effected in the pistons of one cylinder in a pair the appurtenances of the other cylinder in said pair are in the position required for charging. At the same time the quadrant or sector 36 at the first cylinder C of the next pair has slipped by and released the valve arm 30 and permitted the gas and air supply valve 25 to close automatically. Both valves 25 and 26 now remain closed while the pistons 3 accomplish the return or inward stroke. During this inward movement of said pistons the compressing of the gas is accomplished in readiness for another explosion. While the several operations above described are being accomplished at the respective cylinders A, B and C the quadrant or sector 37 adjacent to the cylinder D has been moved sufficiently to engage the valve arm 32 of the exhaust valve 26 and thus open said valve and hold the same open a proper period for exhausting the spent products of combustion under the pressure exerted by the return of the pistons on their inward stroke, the said valve 26 being automatically closed by the action of its spring 33 when the quadrant 37 and valve arm 32 are disengaged at the moment that the pistons complete their inward stroke.

It will be seen that in each cylinder the several operations of charging, compressing, exploding the charge and then exhausting are successively accomplished, the appurtenances of one of the four cylinders of a quadruplex engine being engaged in one of these operations while the others are simultaneously performed in the other engine cylinders. The pistons 3 in each cylinder constitute within their combined bodies the compression and explosion chamber and by reason of their peculiar construction, as hereinbefore described, whereby the whole of the actively explosive charge is thus contained in and between movable parts that also constitute the effective and primal power transmitters of the engine and receive the full force of the momentum or impact of the explosion it is obvious that they will utilize and transmit into effective work the energy heretofore hurtfully diverted into directions of concussion or shock alike injurious to stationary or inert parts of the engine as well as to surrounding objects, such as the floors and walls of buildings. It will be observed, by reference to Figs. 2, 3, and 11, that when the pistons 3 are closed together, in the position assumed immediately prior to explosion, their extended piston surfaces, resulting from the hollowing or recessing of the piston ends, serve to shield the cylinder from the effects of concussion or explosive force. When the pistons are in the position shown in Fig. 3 and while the charge of gas in the chamber 8 is held compressed the lever 35 comes in contact with and actuates the movable electrode 15, the explosion occurs and the pistons by reason of their construction and arrangement take upon themselves the full impact of the liberated energy. At the period of explosion the pistons are separated and driven outward by expansion of the ignited and exploded gases and when they have completed their outward movement and the inward stroke is begun the quadrant 37 engages and opens the exhaust valve 26 and holds it open to the end of the inward stroke thereby permitting the waste products of combustion to pass off freely and without compression and therefore without the consumption of power. At the finish of this inward stroke of the pistons the quadrant 37 slips off from the arm 32 of the exhaust valve 26, which thereupon closes automatically and leaves the combustion chamber 8 filled with hot gases. At this juncture, the outward stroke being again entered upon, the quadrant 36 engages and opens the combined gas and air valve 25 and holds it open for admission of gas until the commencement of the return stroke. Then the arm 30 of the gas and air valve 25 is released from its engagement with the quadrant 36, whereupon the said valve automatically closes while the pistons continue their inward movement to the finish of the stroke and thereby compress and hold the charge in the combustion or explosion chamber. Upon the commencement of the outward stroke the twice sparking make and break contact of the electrodes occurs, the explosion follows and the several operations already explained are consecutively repeated at the different cylinders so long as the engine is kept in operation. The hot gases remaining in the explosion chamber 8 at the conclusion of the exhaust stroke, as above mentioned, still contain a percentage of latent energy on account of uncompleted combustion and serve a doubly beneficent purpose, first, as an efficient diluent of the incoming charge and, second, in performing the functions of a regenerator by imparting heat to the fresh charge of gas. By this means, also, a prompt rarefaction of the cold gases will take place whereby diffusion is hastened, a further percentage of heat is latently absorbed to be given out again as energy and all the conditions are favored that tend most effectually to obtain the greatest amount of work out of the charge.

As shown in Fig. 1 the several longitudinally arranged gas conduits 12 may be supplied with gas through a transverse pipe 38 with which one end of each conduit 12 is connected. Each conduit 12 may communicate at its other end with a transverse pipe 39 provided at a suitable point with a branch pipe 40 through which the exhaust passes from all the cylinders. A gas supply pipe 41 may lead into the transverse inlet pipe 38 from any suitable gas reservoir or holder and in the said pipe 41 may be located a valve (not shown) controlled by a governor 42 that is preferably geared or belted to one of the crank shafts. The transverse pipes 38 and 39 may be supported at their ends by means of brackets 43 secured to the cylinders or their supporting frame and these brackets may also afford bearings for the rotary shaft 34 from which the electrodes and valves are actuated. This shaft 34 is rotated from one of the crank shafts 6, preferably through sprocket gearing 44; the gearing being so arranged that the shaft 34 will make one revolution to two revolutions of the crank shaft from which it is operated. A single stroke of the piston or one half revolution of the crank shaft carries the shaft 34 through one quarter of a revolution which being elongated through the intervention of the levers 35 and quadrants 36 and 37 operates the movable electrodes and the supply and exhaust valves in the manner already described.

Figure 12:
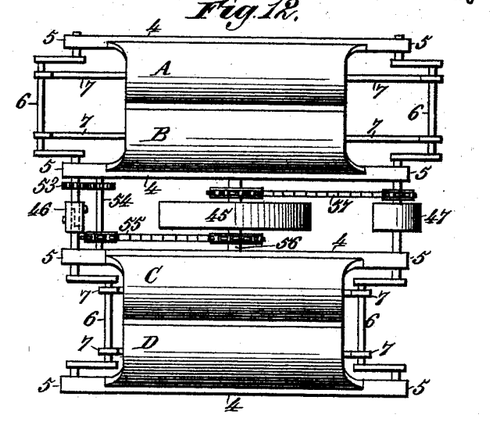
Fig. 12 is a plan of a quadruplex engine constructed according to my improvements, the gas supply and electrical connections being removed and showing the crank shafts geared to rotate in opposite directions and a fly wheel mounted on a separate shaft below and intermediate the crank shafts.
Figure 15:
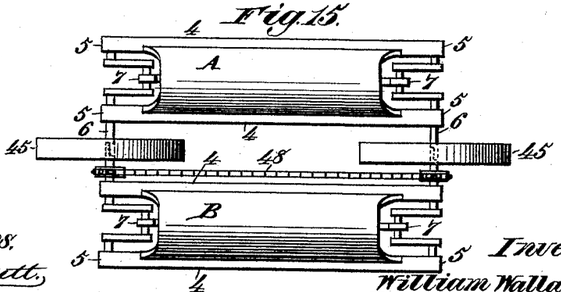
Fig. 15 is a plan of a duplex engine in which the crank shafts are geared to rotate in the same direction and showing a fly wheel mounted on each crank shaft.
Figure 17:
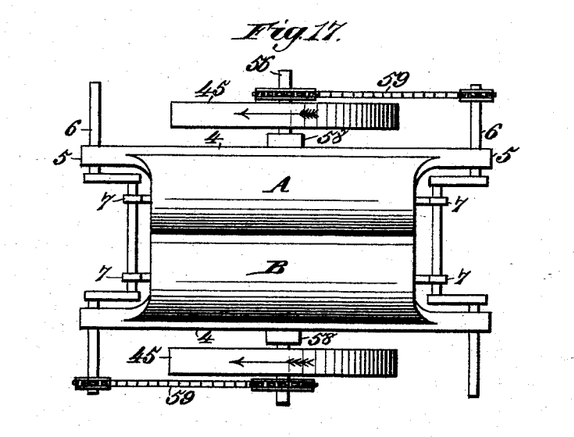
Fig. 17 is a plan of the same showing the pistons of the two cylinders connected with a single crank of each crank shaft.

Although I have explained the operations of the pistons, valves and electric exploding devices with reference more particularly to a quadruplex engine it will be obvious that the several operations are essentially the same in a duplex engine and also in an engine having only a single cylinder. The quadruplex engines illustrated in Figs. 1, 2 and 12 may be formed by making a suitable connection between two duplex engines placed side by side and preferably having the contiguous ends of their crank shafts properly shouldered so as to splice with each other, the said ends of the crank shafts being secured together by means of fly wheels 45 attached at those points to said crank shafts as shown in Fig. 2 or by means of a coupling sleeve 46 or belt pulley 47 as shown in Fig. 12. By dividing or disconnecting the crank shafts in the center each half of a quadruplex engine can be readily converted into a duplex engine having the same features of construction and operation as in the quadruplex form. In like manner, as shown in Fig. 15, a duplex engine and a single cylinder engine are readily convertible one into another by disconnecting or properly connecting, as the case may be, the contiguous ends of their crank shafts. In a quadruplex engine the cranks at the opposite ends of each crank shaft are arranged or set to alternate with each other and the pistons of two adjacent cylinders are connected with the same crank, whereas in a duplex engine the cranks do not alternate and may be formed as only one crank on each shaft as shown in Fig. 17. Thus the pistons in two contiguous cylinders perform their operations simultaneously and in line with each other alike in the quadruplex engine and duplex engine. It will be seen that in both forms of engine the arrangement of the crank shafts, pistons, rotary shaft 34 and its levers and quadrants is such as to equalize the application of power to each of said crank shafts and obviate jars and strains.

Figure 13:
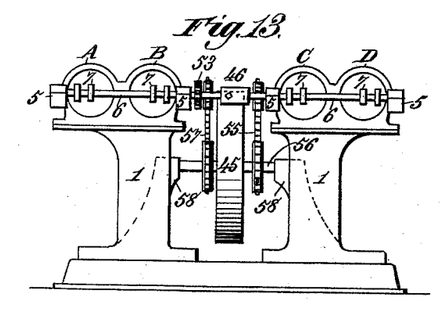
Fig. 13 is an end elevation of the same.
Figure 14:
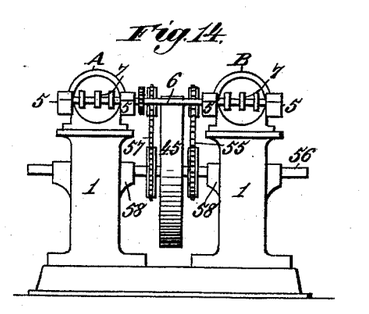
Fig. 14 is an end elevation of a duplex engine embodying my improvements, the gas supply and electrical connections being removed, the crank shafts geared to rotate in opposite directions and a fly wheel mounted on a separate shaft below and intermediate the crank shaft.

For the purpose of causing the two crank shafts to move in unison or with equal speed they may be directly connected by suitable belting or sprocket gearing 48, as shown in Figs. 1 and 15, whereby both crank shafts are made to rotate in the same direction. Instead of gearing the crank shafts directly they may be geared indirectly and thus caused to rotate in opposite directions as shown in Figs. 2, 12, 13 and 14. As shown in Fig. 2 each crank shaft may be connected by sprocket gearing 49 with a counter shaft 50 connected by spur gears 51 with a similar shaft 52 which connects by sprocket gearing 49 with the other crank shaft. In Figs. 12, 13 and 14 one of the crank shafts is shown as connected by spur gears 53 with a shaft 54 which connects by sprocket gearing 55 with a shaft 56 that is connected in turn by sprocket gearing 57 with the other crank shaft. The shaft 56 is journaled in suitable bearings 58 below and intermediate the two crank shafts and may have a fly wheel 45 mounted thereon.

As shown in Figs. 1, 2 and 15 fly wheels may be carried either upon the crank shafts, as in engines designed for work requiring especially high speed or, as shown in Figs. 12, 13, 14, 16 and 17, for the purpose of avoiding tangential strain and obtaining a smooth easy running of the engine with freedom from jars and vibrations. Provision is made for lowering the balance or fly wheel and mounting it upon a shaft 56 having free working bearings 58 centrally arranged in the base or frame of the engine well below the line of the cylinders, thereby giving to the engine greater compactness, solidity and stability.

Figure 16:
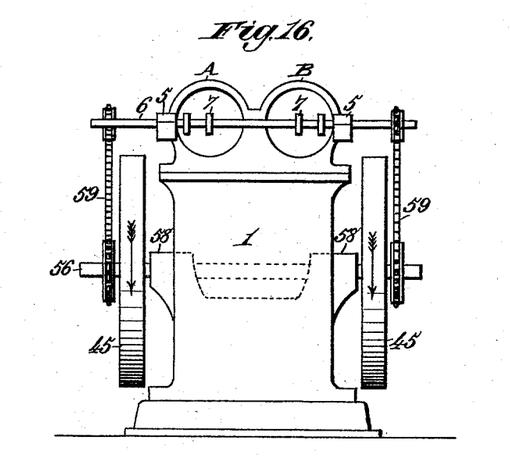
Fig. 16 is an end elevation of a duplex engine, being one half of a quadruplex engine, and illustrating the arrangement of two fly wheels on a shaft journaled in bearings below the engine cylinders and intermediate the crank shafts.

In Figs. 16 and 17 I have shown a form of duplex engine in which the pistons of both cylinders are connected to a single crank of each crank shaft and in which said crank shafts are connected by sprocket gearing 59 with an intermediate shaft 56 journaled in bearings 58 located in the base or frame of the machine below the cylinders and intermediate the crank shafts. On each end of the intermediate shaft 56 a fly wheel 45 may be mounted, as shown, though only one fly wheel may be employed, if preferred. It will be seen that the sprocket gearing 59 is so arranged as to cause the crank shafts 6 to revolve in unison and in the same direction. The intermediate shaft 56 may be arranged to project beyond its bearings 58, as shown in Figs. 14, 16 and 17, for the attachment of pulleys or for other purposes such as to facilitate the coupling together of two duplex engines to form the quadruplex type. If desired the frame of the quadruplex engine shown in Fig. 1 may be provided with journal bearings 58 for an intermediate shaft on which the fly wheels can be mounted as above described.

In both the duplex and quadruplex forms of engine the intermediate shaft 56 can be provided with sprocket gears of such relative diameter to the sprocket gears on the crank shafts as to cause the shaft 56 and attached fly wheels to revolve at any desired speed, preferably greater than that of the crank shafts. An engine of this description in which the fly wheel is mounted below and intermediate the crank shafts on a shaft journaled in bearings located in the engine frame below the cylinders, and constituting in my engine the normal position for the fly wheel as described, will be comparatively free from injurious vibrations and tangential strains besides possessing the advantages of greater compactness of structure.

The engine is designed to be operated by the employment of such of the fixed gases or with the vapors or gases of such of the liquid hydro-carbons as are commonly used for such purposes, either with or without the mixture therewith of oxygen or atmospheric air. By the action of the twice sparking electrodes with two periods of separation alternating with the double make and break contact of their V shaped teeth as the movable electrode contacts with and passes by the fixed electrode the ignition and explosion of the gas within the explosion chamber of the pistons is assured at the proper time. The extent or length of the arc in each quadrant or sector is preferably made to correspond with that of the stroke of a piston in one direction so that it will hold its corresponding gas or exhaust valve open through that stroke. There being two of these sectors for each cylinder, or one for each valve, and each sector as well as each electrode actuating lever 35 being attached to the shaft 34 by means of a set screw 60, a ready adjustment of said levers and sectors is permitted so that however closely together the valves 25 and 26 may be located the sectors can be set to properly correspond therewith.

In practice it is preferable to locate the valves 25 and 26 very closely together so that but little gas will occupy the space between them, whereby practically the whole of the actively explosive charge will be contained in and inclosed by the explosion chamber of the pistons. Any abbreviation of the volume of the charge to be taken into the explosion chamber or any compression it might be desired to impart to the exhaust in expelling it, and at whatever part of the stroke, may all be accomplished through the employment of any sector of a circle less than a quadrant, or greater, as the service required may demand and readjustment of the levers and sectors with relation to the stroke of the piston.

It will be understood that in each explosion chamber of the engine, between the pistons of the respective cylinders, the several operations of charging, compressing, exploding and exhausting are successively performed in progressive time movements. At one cylinder of a duplex engine, or one cylinder of a pair in a quadruplex engine, during the outward stroke of the pistons, the explosion and expansion of gases will take place to give increased impetus to the pistons while at the other cylinder of the pair the charging of the gas will be accomplished. On the inward stroke of the pistons exhaustion of the expended gases will be accomplished at the cylinder where the last explosion was made while at the other cylinder of the pair the gas will be compressed in readiness for explosion, which will occur just as the pistons of this cylinder commence an outward stroke. In a single cylinder engine the operations are the same as already described with reference to the duplex and quadruplex types.

What I claim as my invention is—

1. In a gas engine, the combination of a cylinder having a port intermediate its ends for gas admission and exhaust, a valved gas conduit communicating with the cylinder through said port, and two pistons simultaneously movable from and toward each other and having their opposing ends or faces correspondingly recessed to form a compression and explosion chamber that is wholly inclosed by the piston walls, the edge of each piston being provided with a half slot to form a single opening through which said explosion chamber communicates with the gas supply and exhaust passages, substantially as described.

2. In a gas engine, the combination of a cylinder having a single port for gas admission and exhaust, two pistons simultaneously movable to and from each other, a gas compression and explosion chamber located in and between the opposing faces of said pistons and wholly inclosed by the piston walls, a valved gas conduit communicating with said explosion chamber through the cylinder port and through an opening partly formed in the edge of each piston, and means for automatically igniting and exploding a charge of gas contained in the said explosion chamber, substantially as described.

3. In a gas engine, the combination with a cylinder and a valved gas conduit communicating with said cylinder through a single port for gas admission and exhaust, said port located midway between the cylinder ends, of two pistons movable simultaneously to and from each other, an explosion chamber located wholly in the opposing ends or faces of said pistons, an electric circuit comprising a fixed electrode and a movable electrode each provided with a series of contact points arranged at right angles to the contact points on the other electrode, and mechanism for automatically actuating the movable electrode to effect a twice sparking make and break contact with the fixed electrode, substantially as described.

4. In a gas engine, the combination with a cylinder and piston, of a fixed electrode and a movable electrode, said electrodes each provided with a series of V-shaped teeth or contact points arranged at right angles to the teeth or contact points on the other electrode, an electric circuit, and means for actuating the movable electrode to cause it to effect a twice sparking make and break contact with the fixed electrode, substantially as described.

5. In a gas engine, the combination with a cylinder and piston, of a fixed electrode having a series of teeth or contact points thereon, a movable electrode adapted to be oscillated or partly rotated on its axis and having a hub provided with a series of teeth or contact points at right angles to the teeth or contact points on the fixed electrode, said electrodes located in proximity to the charge of gas to be exploded, an electric circuit, and means for oscillating the movable electrode on its axis to effect a twice sparking make and break contact with the fixed electrode, substantially as described.

6. In a gas engine, the combination with a cylinder and piston, of a fixed electrode, a movable electrode adapted to have a twice sparking make and break contact with the fixed electrode, a screw plug in which both of said electrodes are mounted, a yielding tube surrounding the fixed electrode, an insulated and infusible packing intermediate said tube and fixed electrode, an electric circuit and means for actuating the movable electrode, substantially as described.

7. In a gas engine, the combination with a cylinder and piston, of a fixed electrode, a movable electrode adapted to have a twice sparking make and break contact with the fixed electrode, an electric circuit, a lever adapted to engage the movable electrode at intervals and thereby actuate it in one direction and a spring to actuate said electrode in the opposite direction when released by the lever, substantially as described.

8. In a gas engine, the combination with a cylinder and piston, of a gas conduit communicating with the cylinder and provided with a combined gas and air valve having a screw plug for regulating or cutting off the flow of air and an exhaust valve, a fixed electrode, a movable electrode adapted to have a twice sparking make and break contact with the fixed electrode, an electric circuit, a rotary shaft, a lever and sectors carried by said shaft and respectively adapted to actuate the movable electrode and the gas valve and exhaust valve at proper intervals and in one direction and springs to return said electrode and valves, substantially as described.

9. In a gas engine, the combination of a cylinder, two pistons adapted to be moved simultaneously from and toward each other and having their opposing ends or faces correspondingly hollowed or recessed to form an explosion chamber that is wholly inclosed by the piston walls, a gas conduit communicating with said chamber through a port intermediate the cylinder ends, said gas conduit provided with a combined gas and air valve and an exhaust valve, springs for automatically closing said valves, a fixed electrode and a movable electrode supported intermediate said valves and in proximity to the charge of gas to be exploded, an electric circuit, a rotary shaft, a lever carried by said shaft and adapted to actuate the movable electrode in one direction at intervals, a spring for returning the said movable electrode when released by said lever whereby a twice sparking make and break contact of the electrodes is effected, and sectors carried by the rotary shaft to open the gas valve and exhaust valve in succession, substantially as described.

10. In a gas engine, the combination of a pair of cylinders each provided with two pistons adapted to be moved simultaneously from and toward each other, crank shafts at the opposite ends of the engine, pitmen that connect two pistons of two cylinders to a single crank of each crank shaft whereby the pistons in both cylinders are caused to move in line with each other, and gearing to connect said crank shafts and cause them to rotate in unison, substantially as described.

11. In a gas engine, the combination of a pair of cylinders, two pistons in each cylinder adapted to be moved simultaneously from and toward each other and having their opposing ends or faces correspondingly hollowed or recessed to form an explosion chamber that is wholly inclosed by the piston walls, crank shafts at the opposite ends of the engine, pitmen that connect two pistons of two cylinders to a single crank of each crank shaft whereby the pistons in both cylinders move in line with each other, gearing to connect the crank shafts and cause them to rotate in unison, gas conduits communicating with the explosion chambers of the pistons, said gas conduits each provided with a combined gas and air valve and an exhaust valve, springs for automatically closing said valves, electric sparking devices supported intermediate said valves at each cylinder and in proximity to the charge of gas, an electric circuit, and a rotary shaft provided with a series of sectors and levers for actuating the said valves and electric sparking devices, substantially as described.

12. In a gas engine, the combination of a pair of cylinders each provided with two pistons adapted to be moved simultaneously from and toward each other and having their opposing ends or faces correspondingly hollowed or recessed to form an explosion chamber that is wholly inclosed by the piston walls, crank shafts at the opposite ends of the engine, pitmen that connect two pistons of two cylinders to a single crank of each crank shaft whereby the pistons in both cylinders move in line with each other, gearing to connect the crank shafts and cause them to rotate in unison, valved gas conduits communicating with the explosion chambers of the pistons, electric sparking devices, an electric circuit and actuating mechanism for the valves of the gas conduits and the electric sparking devices, substantially as described.

13. In a gas engine, the combination of a pair of cylinders each provided with two pistons adapted to be moved simultaneously from and toward each other and having their opposing ends or faces correspondingly hollowed or recessed to form in each pair of pistons an explosion chamber that is wholly inclosed by the piston walls, crank shafts at the opposite ends of the engine, pitmen that connect two pistons of two cylinders to a single crank of each crank shaft whereby the pistons in both cylinders move in line with each other, gas conduits communicating with the explosion chambers of the pistons, said gas conduits each provided with a combined gas and air valve and an exhaust valve, twice sparking electrodes, supported intermediate said valves at each cylinder, an electric circuit, and actuating mechanism for said valves and electric sparking devices, substantially as described.

14. In a gas engine, the combination of a series of cylinders arranged in pairs and each provided with two pistons movable simultaneously to and from each other, crank shafts located at the opposite ends of the engine and each provided with alternating cranks, pitmen that connect two pistons of each pair of cylinders to a single crank of a crank shaft whereby the corresponding pistons in both cylinders of a pair are caused to move in line with each other, and gearing to connect the crank shafts and cause them to rotate in unison, substantially as described.

15. In a gas engine, the combination of a series of cylinders arranged in pairs, each cylinder provided with two pistons adapted to be moved simultaneously from and toward each other and having their opposing ends or faces correspondingly hollowed or recessed whereby an explosion chamber wholly inclosed by the piston walls is formed in and between each pair of pistons, crank shafts located at the opposite ends of said cylinders and each provided with alternating cranks, pitmen that connect two pistons of each pair of cylinders to a single crank of each crank shaft whereby the pistons in both cylinders of a pair move in line with each other, means for charging and exhausting the several explosion chambers, electric sparking devices and an electric circuit, substantially as described.

16. In a gas engine, the combination of a series of cylinders arranged in pairs, each cylinder provided with two pistons adapted to be moved simultaneously from and toward each other and having their opposing ends or faces correspondingly hollowed or recessed to form an explosion chamber that is wholly inclosed by the piston walls, crank shafts supported at opposite ends of the engine and each provided with alternating cranks, pitmen that connect two pistons of each pair of cylinders to a single crank whereby the pistons of both cylinders in a pair move in line with each other, gearing to connect the crank shafts and cause them to rotate in unison, valved gas conduits communicating with the explosion chambers of the pistons, electric sparking devices, an electric circuit, and actuating mechanism for the valves of the gas conduits and the electric sparking devices, substantially as described.

17. In a gas engine, the combination of a series of cylinders arranged in pairs, each cylinder provided with two pistons adapted to be moved simultaneously from and toward each other and having their opposing ends or faces hollowed or recessed to form an explosion chamber, crank shafts mounted at opposite ends of said cylinders and each provided with alternating cranks, pitmen that connect two pistons of each pair of cylinders to a single crank, gearing to connect said crank shafts, a series of connected gas conduits, each gas conduit communicating with an explosion chamber of the pistons and provided with a combined gas and air valve having a screw plug for regulating or cutting off air supply and an exhaust valve, a fixed electrode and a movable electrode supported intermediate each pair of said valves, an electric circuit, a rotary shaft geared with one of the crank shafts, a series of levers carried by said shaft and adapted to actuate the movable electrodes in one direction, springs for returning said movable electrodes when released by said levers, a series of sectors carried by said rotary shaft and arranged in pairs to act upon and open the valve of the gas conduits, and springs for closing said valves when released, substantially as described.

18. In a gas engine, the combination of two or more cylinders arranged in pairs each cylinder provided with two pistons adapted to be moved simultaneously from and toward each other, crank shafts mounted at opposite ends of said cylinders and connected with their pistons, a cylinder supporting frame provided with journal bearings located below the cylinders and intermediate the crank shafts, an intermediate shaft mounted in said bearings and geared with the crank shafts, and a fly wheel mounted on said intermediate shaft, substantially as described.

19. In a gas engine, the combination of two or more cylinders arranged in pairs, each cylinder provided with two pistons adapted to be moved simultaneously from and toward each other, crank shafts mounted at opposite ends of said cylinders, pitmen connecting two pistons of each pair of cylinders to a single crank of each crank shaft, a frame provided with journal bearings located below the cylinders and intermediate the crank shafts, an intermediate shaft mounted in said bearings and geared with the crank shafts to revolve at a greater speed than said crank shafts, and one or more fly wheels mounted on said intermediate shaft, substantially as described.

20. In a gas engine, the combination of a cylinder provided with two pistons, crank shafts mounted at opposite ends of said cylinder and connected with the pistons, a cylinder supporting frame or base provided with journal bearings located below the cylinder and intermediate the crank shafts, a fly wheel shaft mounted in said bearings and geared with the crank shafts, and one or more fly wheels carried on said fly wheel shaft, substantially as and for the purposes described.

In testimony whereof I have hereunto set my hand and affixed my seal in presence of two subscribing witnesses.

WILLIAM WALLACE GRANT. [L. S.]

Witnesses:
WILLIAM J. LYNCH,
HENRY MEYERHOLZ, Jr.